United States Patent [19]

Kaiju et al.

[11] Patent Number: 5,240,185
[45] Date of Patent: Aug. 31, 1993

[54] POWDER PAINT SUPPLY DEVICE

[75] Inventors: Haruhisa Kaiju, Kobe; Hitoshi Yoshida, Suita; Junichi Yukikawa; Akihisa Yoshizaki, both of Osaka, all of Japan

[73] Assignee: Matsuo Sangyo Co., Ltd., Osaka, Japan

[21] Appl. No.: 813,013

[22] Filed: Dec. 24, 1991

[30] Foreign Application Priority Data

| Dec. 27, 1990 | [JP] | Japan | 2-408025 |
| Dec. 27, 1990 | [JP] | Japan | 2-408053 |
| Jun. 18, 1991 | [JP] | Japan | 3-145802 |
| Jun. 19, 1991 | [JP] | Japan | 3-147378 |

[51] Int. Cl.$^5$ .............................. B05B 5/00
[52] U.S. Cl. ...................... 239/690; 239/325; 222/412
[58] Field of Search ........... 239/325, 379, 690, 704; 222/412

[56] References Cited

U.S. PATENT DOCUMENTS 4,770,344  9/1988  Kaiser ..................... 239/704

Primary Examiner—Andres Kashnikow
Assistant Examiner—Lesley D. Morris
Attorney, Agent, or Firm—Wenderoth, Lind & Ponack

[57] ABSTRACT

A fluidized type paint powder tank has a fluidizing chamber for fluidizing paint powder and a storage chamber into which the paint powder in the fluidizing chamber is fed to keep it still. There is also provided a paint supply device for an electrostatic powder painting apparatus that includes a paint tank for containing paint powder and a painting gun coupled to the paint tank through an injector and a hose. The device includes a discharge member for discharging the paint powder from the paint tank and a hopper for receiving the paint powder discharged by the discharge member. A screw feeder is provided under the hopper. With this arrangement, the paint powder supplied at a uniform rate by the screw feeder is fed into the injector.

3 Claims, 8 Drawing Sheets

POWDER PAINT SUPPLY DEVICE

BACKGROUND OF THE INVENTION

This invention relates to an improved paint powder supply device for use in electrostatic powder painting apparatus as extending from a paint powder tank to a painting gun and adapted to effect a uniform discharge of paint powder through the painting gun and thus to create a painted surface having a uniform paint film thickness.

A conventional paint powder supply device has various problems. First, the paint powder tank has the following problems. Heretofore, a fluidized type paint powder tank has been used as the tank of the electrostatic paint powder apparatus.

In such a paint powder tank, a porous resin plate is provided at the bottom of the tank. Compressed air is supplied into the tank through the porous resin plate to stir and dehumidify the paint powder in the tank. The density of the paint powder in the tank changes with its amount in the tank.

For example, as the amount of paint powder in the tank decreases, i.e. as the level of the paint powder in the tank becomes lower, the density of the paint powder decreases correspondingly.

Thus, if the paint powder in the fluidized type powder tank is drawn out by a discharge device such as an injector, the discharge rate changes according to the paint powder level in the tank as shown by line a in FIG. 1.

Thus, it was impossible when using such a conventional fluid type paint powder tank to discharge the paint powder at a uniform rate.

Secondly, there have been the following problems in drawing out the paint powder from the paint powder tank. A conventional device for drawing the paint powder out of the paint powder tank comprises a discharge pipe provided at the lower part of the paint powder tank and a pinch valve attached to the discharge pipe and adapted to close the flow line when air is supplied thereto. The paint powder in the paint powder tank can be discharged by opening and closing the pinch valve.

In this type of device, if the discharge of paint powder is stopped for a long time by the pinch valve, the paint powder left in the part of the discharge pipe upstream of the pinch valve may become moist so that the discharge pipe can become clogged with the paint powder at that part. This makes it difficult for the paint powder to drop smoothly when the pinch valve is opened and thus to supply the paint powder smoothly.

Thirdly, a paint supply device for supplying the paint powder in the paint powder tank to the painting gun had the following problems.

In a conventional paint supply device, an injector is directly attached to the side or top of the paint tank containing the paint powder. The injector is coupled to the painting gun through a hose. The paint powder in the paint tank is drawn out by the injector together with air. The air is used to send the paint powder to the painting gun.

The discharge rate through the painting gun is determined by the air pressure and amount of air in the injector. In order to create a painted surface having a uniform film thickness, the discharge rate through the painting gun has to be uniform.

But even if the air pressure and amount of air in the injector are unchanged, when the amount of paint powder in the paint tank decreases, the air content in the paint powder increases and the pressure changes according to the thickness of the paint powder, so that the amount of paint powder sucked by the injector decreases. This in turn causes a decrease in the rate at which the paint powder is discharged through the painting gun. Thus, it was difficult to form a paint film having a uniform thickness. This may result in transparent paint films or defective painted goods.

If paint powder sticks to the inner surface of the hose extending from the injector to the painting gun or if the hose is closed with foreign matter, a pressure loss will occur in the hose. This reduces the amount of paint sucked into the injector, thus changing the discharge rate of the paint powder.

Thus, in a conventional paint supply device having an injector attached to the paint tank so as to directly aspirate the paint powder from the paint tank, it was difficult to discharge the paint powder through the painting gun at a uniform rate.

SUMMARY OF THE INVENTION

The present invention has been developed in order to overcome the above-described drawbacks of the prior art electrostatic powder painting apparatus.

It is therefore a first object of the present invention to provide a fluidized type powder paint tank which can discharge paint powder at a uniform rate without being affected by the level of the paint powder in the tank.

A second object of the present invention is to provide a paint powder discharge device which prevents the discharge pipe from getting clogged with paint powder and thus can assure a smooth discharge of the paint powder from the tank.

A third object of the present invention is to provide a paint powder supply device which assures a uniform discharge rate of powder paint through the painting gun.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

To achieve the first objection of the present invention, the fluid type paint powder tank is improved. Its embodiments are described with reference to FIGS. 2-6.

The fluidized type paint powder tank 1 according to this invention has a fluidizing chamber 2 for moving paint powder A as a fluid and a storage chamber 3 for holding the paint powder A, drawn from the fluidizing chamber 2, in a stationary state.

Figure 2:
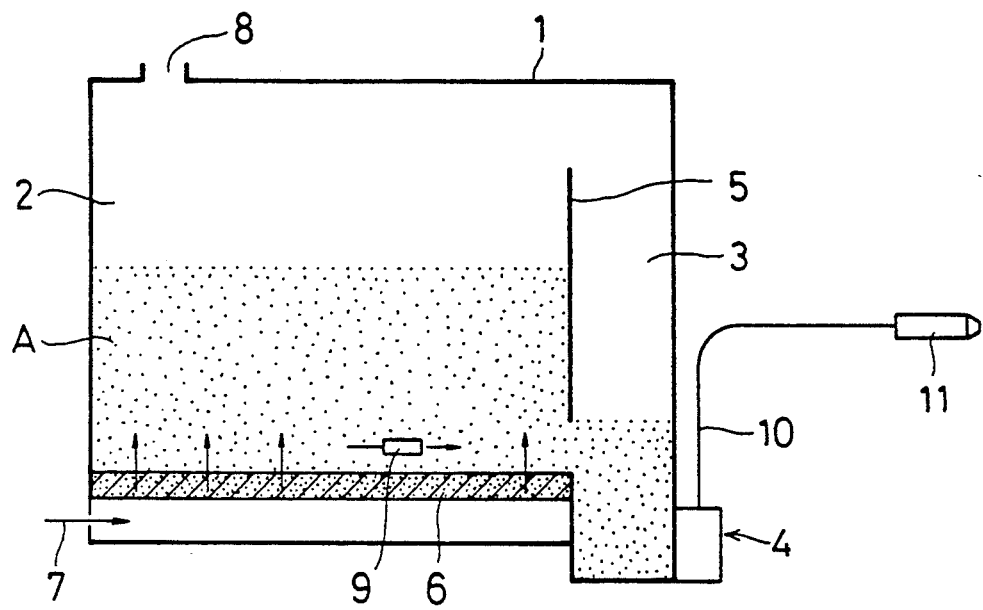
FIGS. 2-6 are schematic diagrams of preferred embodiments of the paint powder tank according to the present invention, FIGS. 2, 4 and 6 being side views of the various embodiments and FIG. 3 being a plan view of the embodiment shown in FIG. 2.
Figure 3:
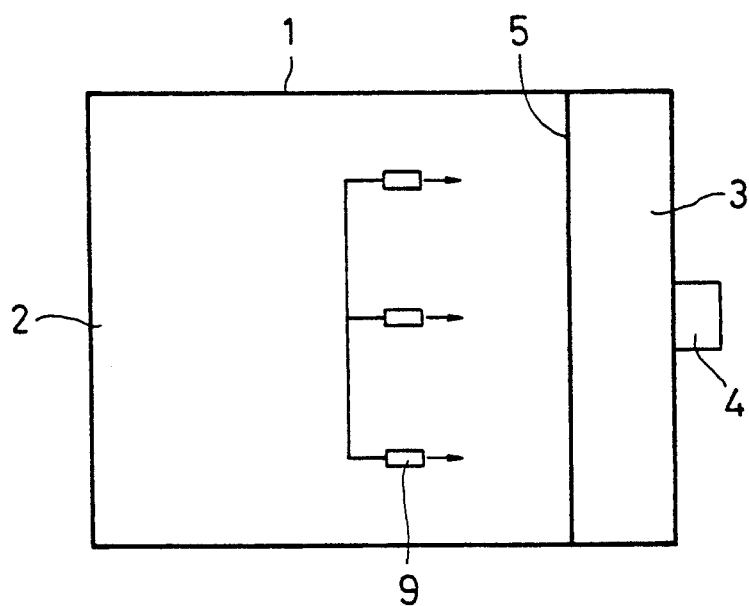
Figure 4:
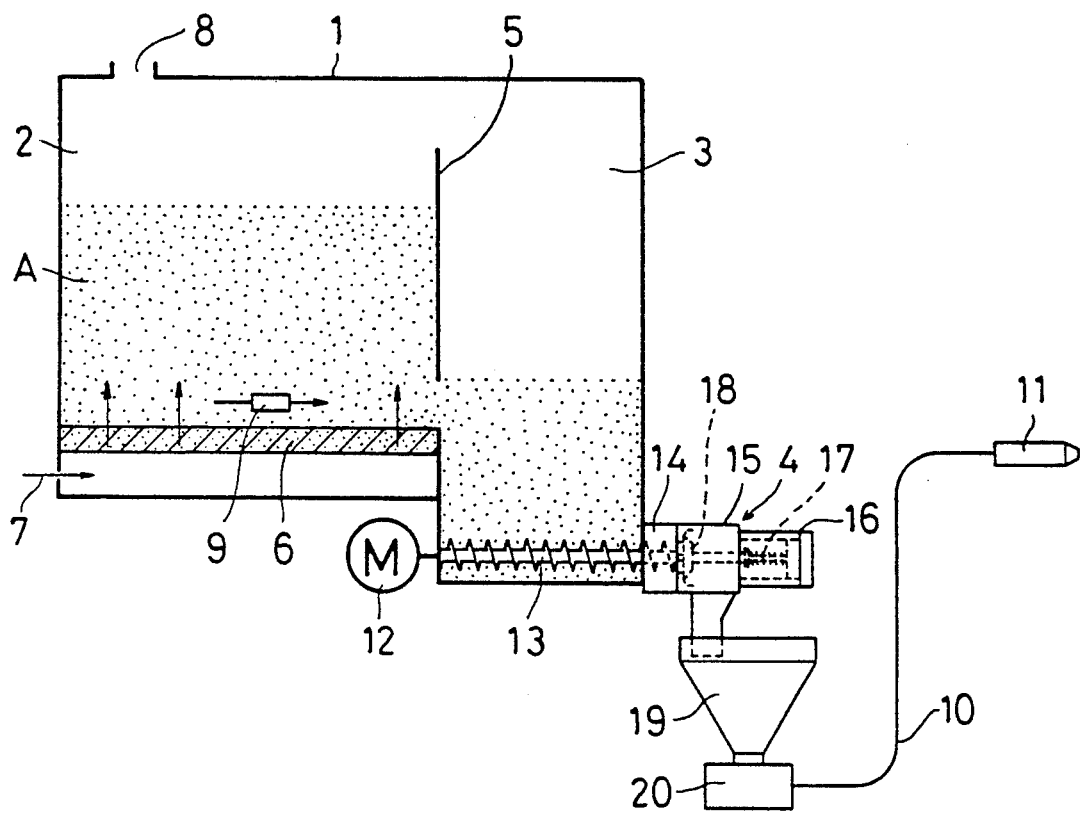

A discharge device 4 is attached to the storage chamber 3 to discharge the paint powder A therefrom. The paint powder tank of the embodiment shown in FIGS. 2 and 3 is provided with a partitioning wall 5 on the righthand side thereof, defining the fluidizing chamber 2 to the left of the wall 5 and the storage chamber 3 to its right.

In the fluidizing chamber 2 at the lower part thereof, a porous plate 6 is provided slightly spaced apart from the bottom thereof. Compressed air 7 is fed under the porous plate 6. An air vent 8 is provided at the top of the fluidizing chamber 2.

The fluidizing chamber 2 and the storage chamber 3 communicate with each other at the lower part of the fluidizing chamber 2. An air purge nozzle 9 is provided in the fluidizing chamber 2 at the lower part thereof to discharge the paint powder A in the fluidizing chamber 2 into the storage chamber 3 by intermittently feeding air toward the storage chamber 3. As shown in FIG. 3, this nozzle 9 may take the form of three nozzle members connected so as to receive air in common. Instead of the air purge nozzle 9, a scraper which moves on and along the porous plate 6 toward the storage chamber 3 may be used to discharge the paint powder A in the fluidizing chamber 2 into the storage chamber 3.

The bottom of the storage chamber 3 is at a level lower than the bottom of the porous plate 6 and the bottom of that portion of the tank 1 beneath the fluidizing chamber 2.

An injector as the discharge device 4 is mounted at the lower part of the storage chamber 3. A painting gun 11 is connected to the injector 4 through a powder supply hose 10. The embodiment shown in FIG. 4 has the same structure as the embodiment shown in FIGS. 2 and 3 except with regard to the discharge device 4.

The discharge device 4 in this embodiment has the following structure. Namely, a screw 13 rotated by a motor 12 is mounted at the bottom of the storage chamber 3. A discharge port 14 is formed in the side of the storage chamber 3 at the front end of the screw 13. Beside the discharge port 14, there is provided a cylindrical flow straightener 15 having a drop hole in the bottom thereof. Beside the flow straightener 15, a spring housing 16 is provided. A lid plate 18 is secured to the end of the screw 13 and is pressed against the discharge port 14 by a spring 17 housed in the spring housing 16.

By rotating the screw 13 with the motor 12, the powder A at the bottom of the storage chamber 3 is pushed out toward the discharge port 14. The spring 17 is compressed and the lid plate 18 is opened by this pushing force, so that the power is blown out through a gap between the lid plate 18 and the discharge port 14. The powder thus blown out impinges and moves along the inner peripheral surface of the flow straightener 15 and is discharged in uniform amounts into a hopper 19 provided thereunder. An injector 20 is mounted to the bottom of the hopper 19. The powder is fed from the injector 20 into the painting gun 11 through a powder supply hose 10.

Figure 5:
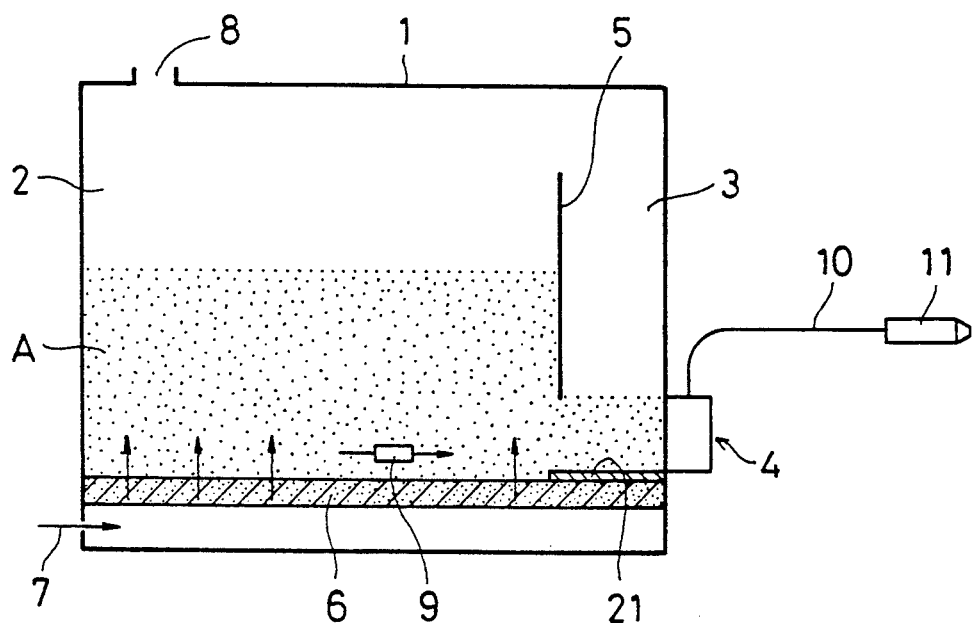

In the embodiment shown in FIG. 5, a porous plate 6 is provided above the bottom of the tank 1 so as to cover the entire bottom surface of the tank 1. A partitioning wall 5 is provided to divide the space over the porous plate into the fluidizing chamber 2 and the storage chamber 3. A shield plate 21 is provided on the portion of the porous plate 6 located in the storage chamber 3 to prevent air from being supplied through the porous plate into the storage chamber 3. Otherwise, the embodiment shown in FIG. 5 has the same structure as the embodiment shown in FIG. 1.

Figure 6:
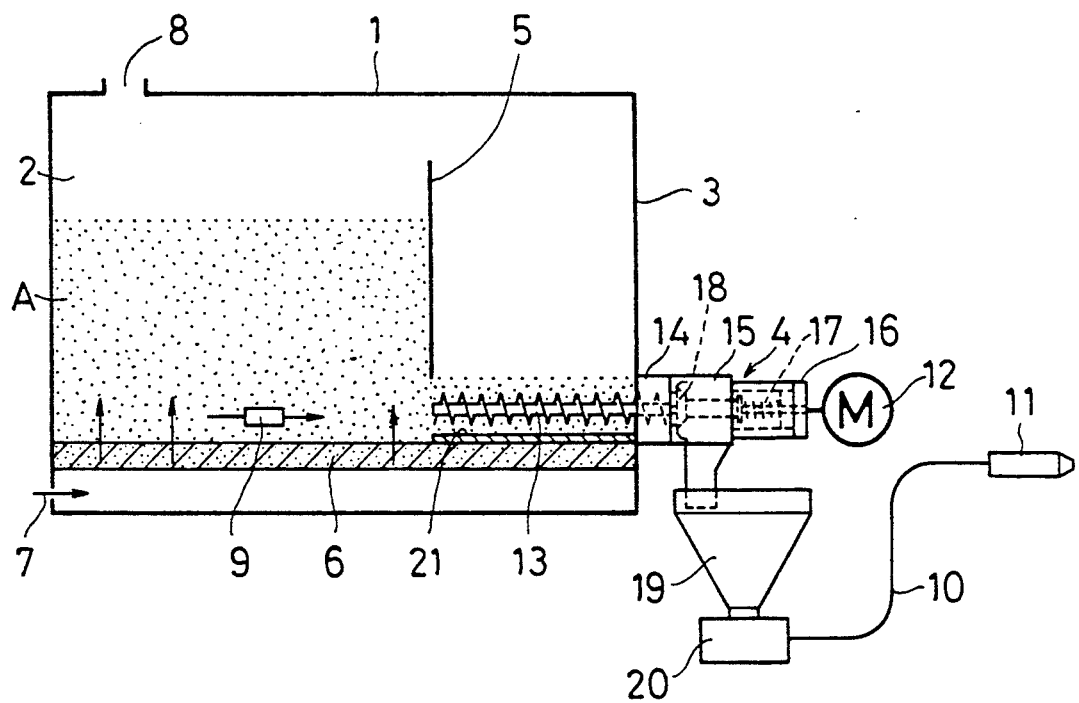

The tank 1 of the embodiment shown in FIG. 6 has the same structure as that of the embodiment shown in FIG. 5. The discharge device 4 has the same structure as that of the embodiment shown in FIG. 4. In the embodiment shown in FIG. 6, the motor 12 for the screw 13 is mounted on the tip of the screw.

Figure 1:
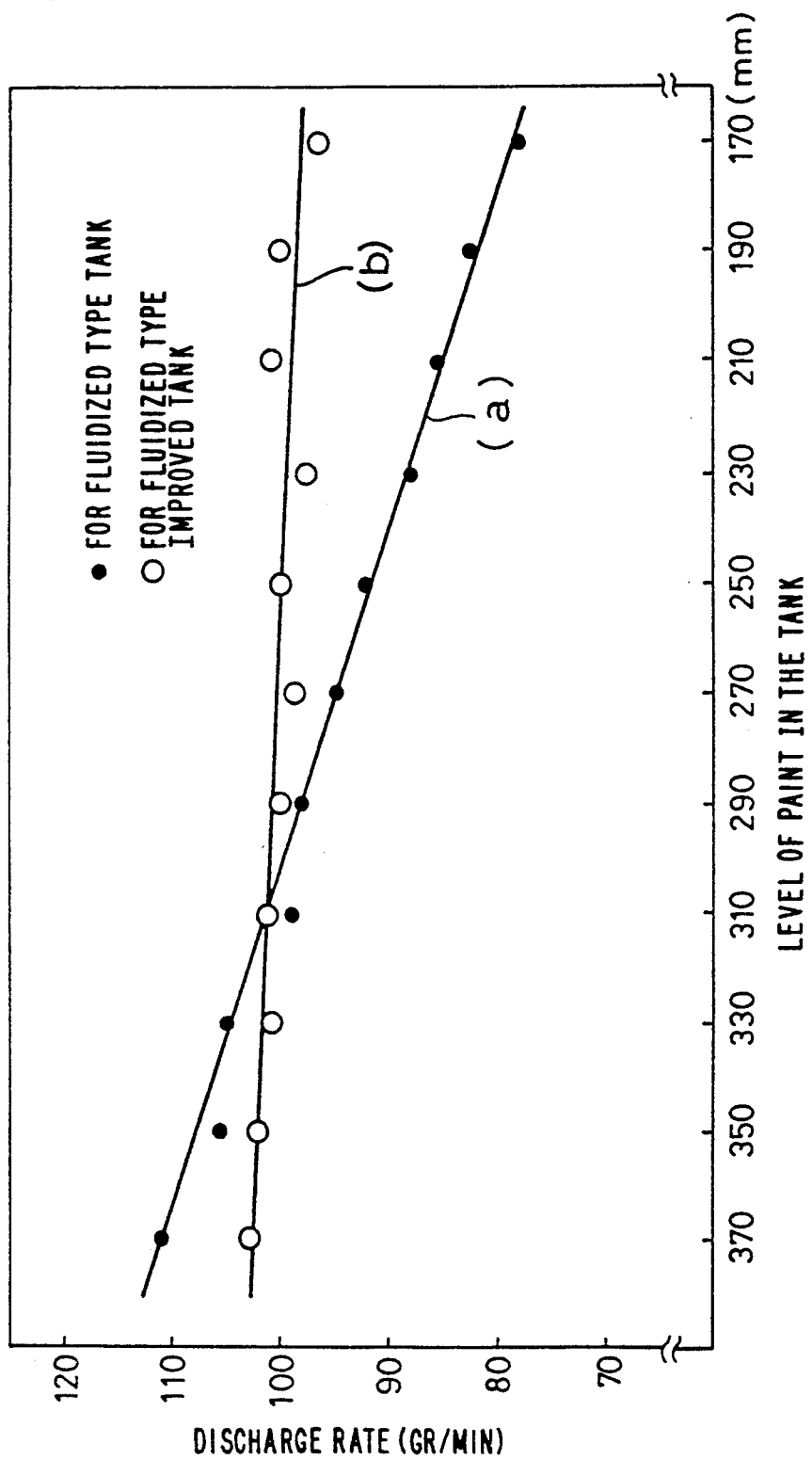
FIG. 1 is a graph of the relation between the level of the paint in the tank and the discharge rate in the conventional apparatus and in the apparatus according to the present invention.

The paint powder tank according to this invention can discharge the paint in constant amounts irrespective of the paint level in the tank, as shown by line (b) in FIG. 1. Thus, the thickness of paint can be kept constant.

Figure 8:
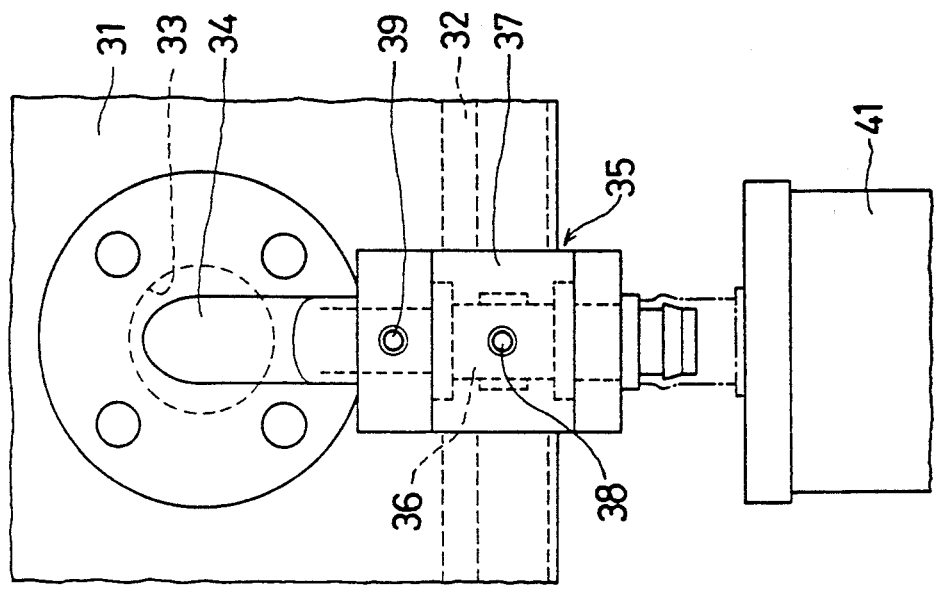
FIG. 8 is a side view of the outlet portion shown in FIG. 7.
Figure 7:
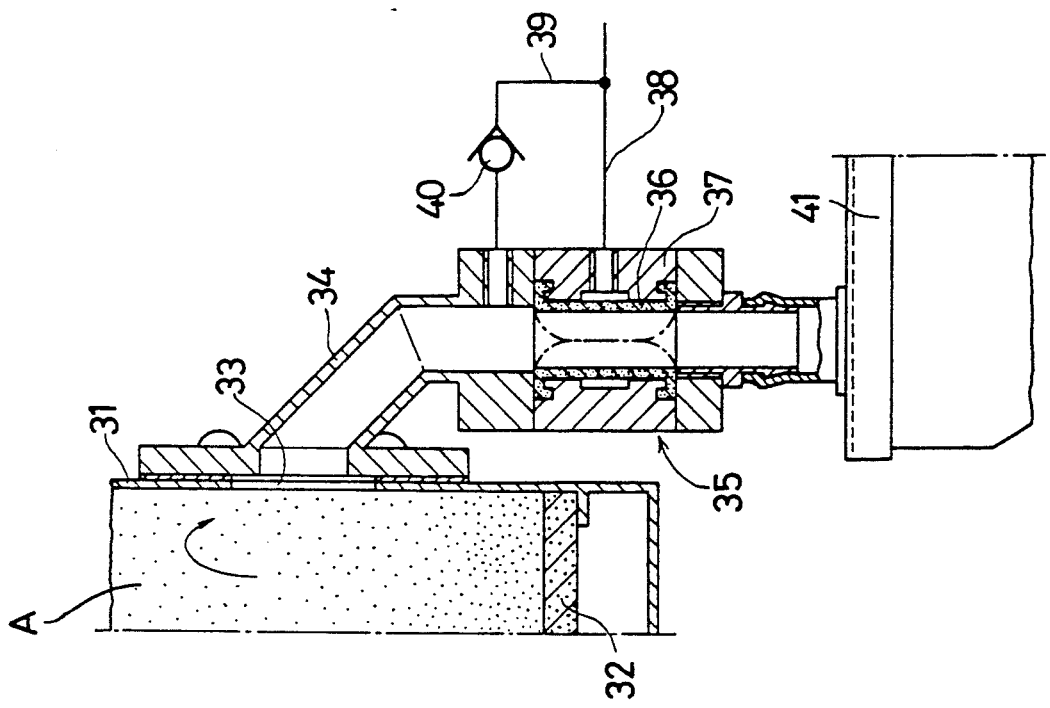
FIG. 7 is a sectional view of the outlet portion of an embodiment of the paint powder tank according to the present invention.

In order to achieve the second object of the present invention, improved means for drawing out the paint powder is provided. The embodiment of the drawing out means is described with reference to FIGS. 7 and 8.

In a paint powder tank 31, a porous plate 32 is mounted at the bottom thereof. Compressed air is supplied under the porous plate 32 to move the paint powder in the tank.

An outlet port 33 is formed in the side wall of the tank 3 at its lower part. An outlet pipe 34 is connected to the outlet port 33.

A pinch valve 35 is connected to the bottom end of the outlet pipe 34. It comprises a collapsible tube 36 made of rubber or the like and a casing 37 covering the tube 36. An air supply pipe 38 is connected to the casing 37. By supplying air through the air supply pipe 38 into a gap between the inner wall of the casing 37 and the outer wall of the tube 36, the tube collapses, thus closing the flow path. When the supply of air is stopped, the tube 36 expands, thereby opening the flow path.

The air supply pipe 38 has a branch pipe 39 connected to the outlet pipe 34 above the pinch valve 35. In the branch pipe 39 is provided a check valve 40 to prohibit fluid flow from the outlet pipe 39 toward the air supply pipe 38.

When the pinch valve 35 is closed by supplying air into the air supply pipe 38 of the pinch valve 35, the air is also supplied through the branch pipe 39 into the outlet pipe 34 thereby bypassing the pinch valve 35. Thus, while the pinch valve 35 is closed, the paint powder in the outlet pipe 34 is continuously moved by the air supplied. This prevents the clogging of the outlet pipe 34.

When the pinch valve 35 is opened by stopping the supply of air into the air supply pipe 38, the supply of air into the outlet pipe 34 through the branch pipe 39 is also stopped. Thus, the paint powder in the paint powder tank 1 is drawn out downwards through the outlet pipe 34 and the pinch valve 35.

The paint powder drawn out through the pinch valve 35 is supplied into the painting gun through a hopper 41.

According to this invention, even if the drawing out of the paint powder is stopped for a long time by shutting the pinch valve 35, the outlet pipe 34 will never clog. Thus, when the pinch valve 35 is opened to resume the drawing out of the paint powder, it will be drawn out smoothly.

Even though no air is supplied through the porous plate 32 provided at the bottom of the paint powder tank 31, air is supplied into the paint powder tank 31 through the outlet pipe 34. Thus, the paint powder in the paint powder tank will be stirred by this air flow even while the device is not in operation.

Figure 10:
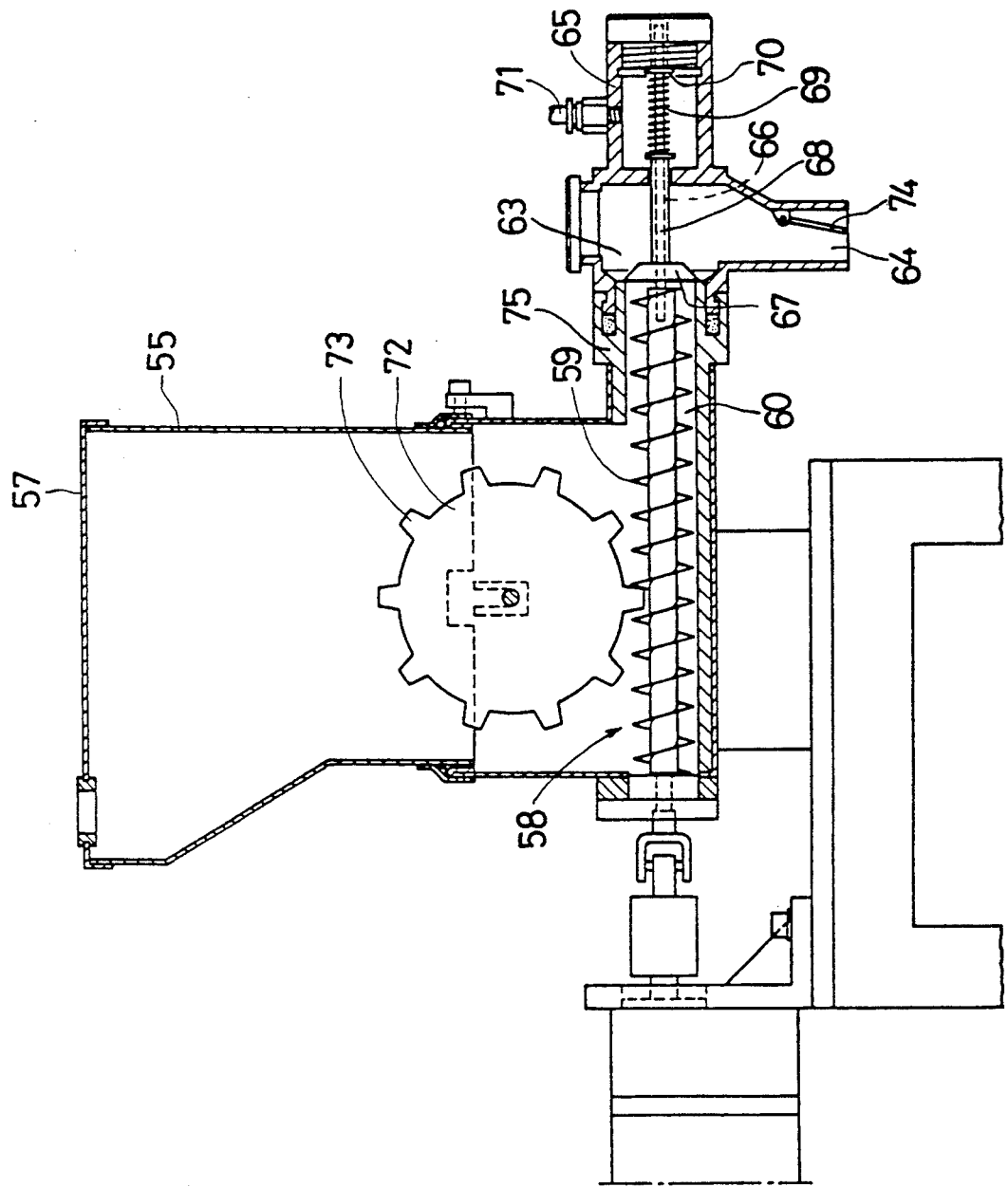
FIG. 10 is a sectional view of a portion of the device shown in FIG. 9.
Figure 11:
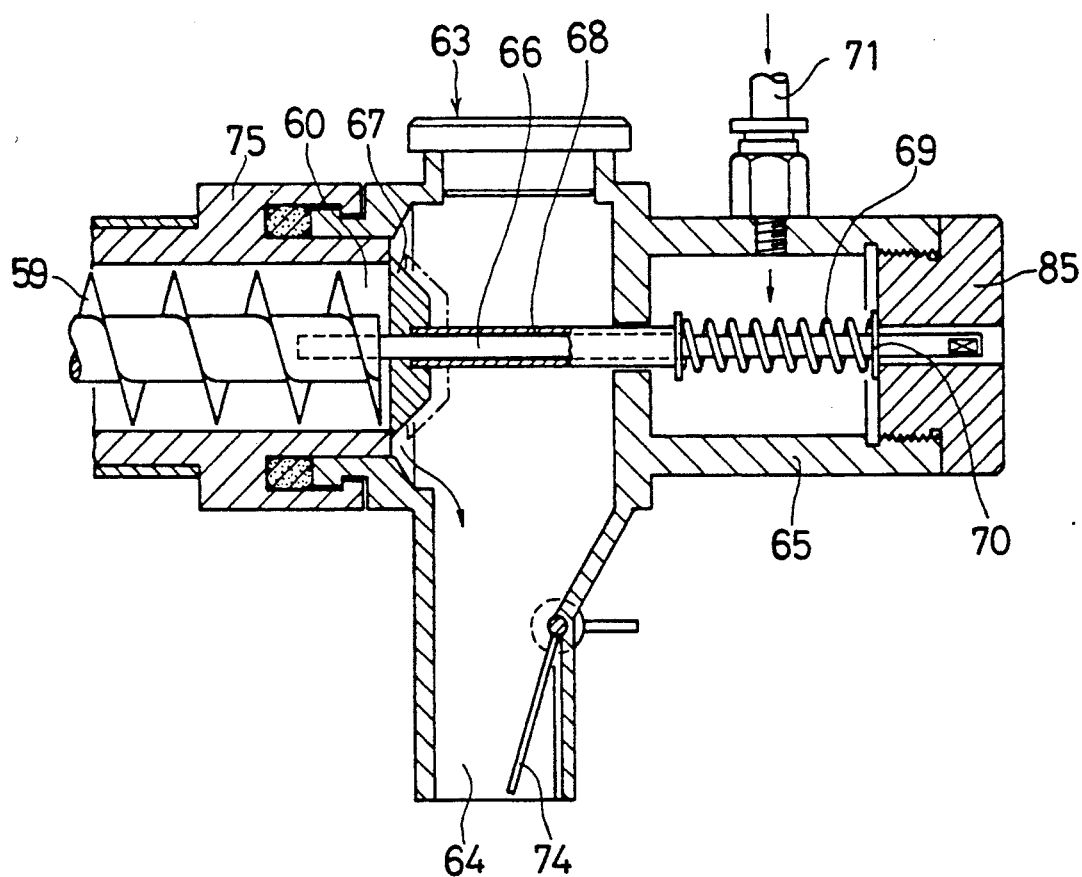
FIG. 11 is an enlarged view of a portion of the device shown in FIG. 10.

In order to achieve the third object of the present invention, an improved paint powder supply device is provided for supplying paint powder from the paint powder tank into the painting gun. Its embodiment is described with reference to FIGS. 9-11.

A paint powder tank 51 is of a fluidized type. In this type of paint powder tank, in order to improve the dispersibility of the paint powder, air is uniformly blown into the powder layer, through a porous plate 52 provided at the bottom of the tank, to fluidize the paint powder.

To the lower part of the paint tank 51 is connected a discharge pipe 54 provided with a pinch valve 53. By opening the pinch valve 53, the paint powder in the paint powder tank 51 can free fall so as to be discharged downward.

The discharge pipe 54 is connected to the top of a hopper 55, which is provided with a level switch 56 for detecting the level of the paint powder stored in the hopper. The hopper 55 is provided with a lid 57 on top thereof. The lid 57 is provided with an air vent to expel excess air present in the paint powder fed into the hopper 55. Thus, the amount of the paint in the hopper 55 per unit volume will be uniform.

Under the hopper 55 is provided a screw feeder 58 for feeding powder. The screw feeder 58 has a screw 59 having its tip protruding into a discharge port 60 formed in the side of the hopper 55 near its bottom. The rear end of the screw 59 protrudes out of the hopper 55 and is coupled to a motor 62 through a joint 61. Adjacent the discharge port 60 there is provided a cylindrical flow straightener 63. Adjacent the flow straightener 63 there is provided a spring housing chamber 65.

To the tip of the screw 59 is coupled a support shaft 66 extending through the flow straightener 63 and the spring housing 65. A lid plate 67 is slidably fitted on the support shaft 66 at its portion located in the flow straightener 63 to close the end face of the discharge port 60. Further, a pipe 68 is fitted on the support shaft 66 at its portion behind the lid plate 67. The pipe 68 has its tip end protruding into the spring housing 65 and its rear end secured to the back of the lid plate 67. A spring 69 is fitted on the support shaft 66 at its portion located in the spring housing 65. The lid plate 67 is pressed by the spring 69 through the pipe 68 against the discharge port 60.

A support plate 70 for supporting the end of the spring 69 is mounted on the tip of the support shaft 66 so as to be movable relative to the support shaft. In order to adjust the force of the spring 69, the support plate 70 is moved by turning a threaded cap 85, provided at the end of the spring housing 65.

An air inlet pipe 71 is connected to the spring housing 65. Its interior is kept at positive pressure, thus preventing paint powder from flowing into the spring housing 65.

An agitating rotary wheel 72 is mounted in the hopper 55 at its lower part. Its periphery is provided with protrusions 73 at predetermined intervals so that they can bit into the pitch gaps defined by the screw 59. Thus, the agitating rotary wheel 72 is adapted to rotate as the screw 59 turns.

A damper plate 74 is provided in a drop port 64 of the flow straightener 63. By changing the angle of the damper plate 74, the size of the drop portion 64 can be changed. Thus, even when supplying a small amount of paint powder, the paint powder is prevented from being scattered. The screw feeder 58 is detachably mounted to the hopper 55. Further, the screw 59 of the screw feeder 58 and a casing 75 are replaceable.

As the screw 59 is rotated by the motor 62, the paint powder forming the lower layer in the hopper 55 is pushed out toward the discharge port 60. By this pushing force, the spring 69 is compressed and the lid plate 67 is opened, so that the paint powder pushed out through a gap between the lid plate 67 and the discharge port 60 will blow out. The paint powder blown out past the lid plate 67 and the discharge port 60 then hits the inner surface of the flow straightener 63 and is discharged at a constant rate through the drop port 64 while moving along the inner peripheral surface of the flow straightener 63.

A chute 76 (FIG. 9) is provided under the drop port 64 of the flow straightener 63. To an outlet 77 of the chute 76 is coupled an inlet port 79 of an injector 78. A hose 81 is coupled to a discharge port 80 of the injector 78. A painting gun 82 is coupled to the tip of the hose 81. A sensor 83 provided in the chute 76 is adapted to detect a predetermined amount of paint powder. The amount of air to be fed into the injector 78 will be sufficient if the paint powder supplied in regular amounts to the inlet port 79 of the injector 78 from the screw feeder 58 can be discharged through the hose 81 and the painting gun 82. An electropneumatic regulator may be provided in the air circuit to regulate, under electrical control, the amount of air supplied to a minimum value corresponding to the discharge amount.

Figure 9:
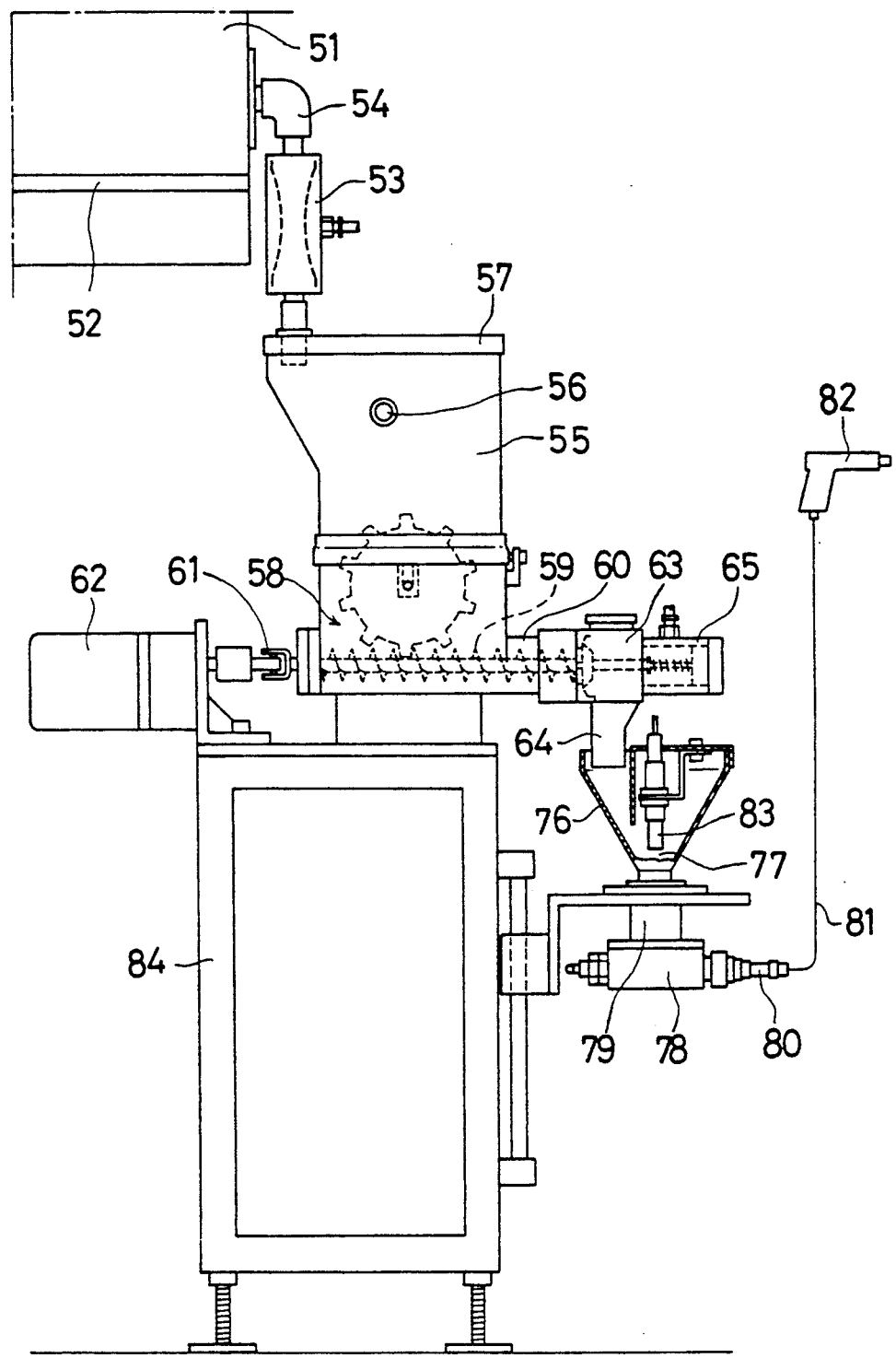
FIG. 9 is a front view, partially broken-away, of the paint powder supply device according to this invention.

A sieve may be provided in the drop port 64 of the screw feeder 58 to improve the dispersibility of the paint powder. In FIG. 9, numeral 84 designates a height-adjustable base.

In the operation of this paint supply device, the pinch valve 53 is opened and closed at predetermined intervals so that the paint powder in the paint tank 51 will accumulate in the hopper 55 in predetermined amounts. The amount is detected by the level switch 56. Any abnormality in the supply of powder can be detected by electrically monitoring the opening and closing of the pinch valve 53 and the time taken until the powder reaches the level switch 56.

Namely, if clogging should occur somewhere in the powder supply line, since the paint powder in the hopper 55 is not consumed, the time taken until the paint powder reaches the level switch 56 after opening the pinch valve 53 will become shorter than a monitoring cycle time. If the powder supply line from the paint tank 51 to the hopper 55 should fail, the time taken until the paint powder reaches the level switch 56 will become longer than the monitoring cycle time. If the time is out of the range of the monitoring cycle time, the line is stopped on the assumption that it has failed.

Any excess air in the paint powder supplied into the hopper 55 is spontaneously expelled while being accumulated. The paint powder in the hopper 55 is fed out at a constant rate through the discharge port 60 by the screw feeder 58. By this push-out force, the spring 69 is compressed and the lid plate 67 is opened, so that the paint powder pushed out through a gap between the lid plate 67 and the discharge port 60 will blow out. The paint powder blown out past the lid plate 67 and the discharge port 60 then hits the inner surface of the flow straightener 63 and is supplied at a constant rate into the inlet port 79 of the injector 78 through the drop port 64 and the chute 76.

The paint powder supplied into the injector 78 is then supplied by air through the hose 81 and is discharged through the painting gun 82.

If the hose 81 is clogged with paint powder, the paint powder will flow over the inlet port 79 of the injector 78 and remain at the outlet 77 of the chute 76. The accumulation of the paint powder at the outlet of the chute 76 is detected by the sensor 83. This makes it possible to stop the painting line when an abnormality is detected. Thus, the production of defective articles can be minimized.

As described above, according to this invention, since paint powder can be supplied at a uniform rate into the injector, the amount of paint discharged through the painting gun can be kept uniform even if there is a slight pressure loss in the hose of the painting gun.

Since the amount of paint powder to be supplied into the injector can be changed by changing the revolving speed of the screw of the screw feeder, the discharge rate through the painting gun can be set to any desired value.

We claim:

1. A paint supply device for use with an electrostatic powder painting apparatus that includes a paint tank for containing paint powder and a painting gun operatively coupled to said paint tank through an injector and a hose, said paint supply device comprising: discharge means for discharging paint powder from a paint tank when the supply device is connected to the tank of an electrostatic painting apparatus, a hopper so associated with said discharge means as to receive paint powder discharged by said discharge means, a screw feeder disposed at the bottom of said hopper, said screw feeder including a casing defining a discharge port at a discharge side thereof, and a screw rotatably supported and extending in said casing to a tip, the tip of said screw protruding to said discharge port, a flow straightener provided adjacent said discharge port and having a drop port in the bottom thereof, a lid plate slidably supported so as to be movable in the axial direction of said screw to and from a position closing said discharge port, and biasing means for urging said lid plate to said position closing the discharge port.

2. A paint supply device for use with electrostatic powder painting apparatus as claimed in claim 1, wherein said biasing means is a spring, and the device includes a housing in which said spring is housed.

3. A paint supply device for use with electrostatic powder painting apparatus as claimed in claim 2, and further comprising an air inlet pipe connected to said spring housing and by which pipe the interior of said housing can be maintained under pressure.

* * * * *